United States Patent [19]
Robinson et al.

[11] Patent Number: 5,533,102
[45] Date of Patent: Jul. 2, 1996

[54] TELEPHONE AUTO ATTENDANT SYSTEM FOR DELIVERING CHOSEN GREETINGS TO CALLERS WHILE ON THE PHONE

[75] Inventors: Michael J. Robinson; Robert C. Greco, both of Seattle, Wash.

[73] Assignee: Active Voice, Seattle, Wash.

[21] Appl. No.: 449,569

[22] Filed: May 24, 1995

Related U.S. Application Data

[63] Continuation of Ser. No. 125,606, Sep. 22, 1993, abandoned.

[51] Int. Cl.⁶ ................................. H04M 11/06
[52] U.S. Cl. .................... 379/67; 379/202; 379/215; 379/230; 379/127; 379/142; 379/93; 379/96
[58] Field of Search ................... 379/201, 98, 265, 379/266, 67, 210, 218, 202, 211, 212, 96, 213, 214, 309, 92, 142, 267, 308, 57, 58, 215, 230, 127, 93

[56] References Cited

U.S. PATENT DOCUMENTS

| | | | |
|---|---|---|---|
| 4,697,282 | 9/1987 | Winter et al. | 379/67 |
| 4,723,273 | 2/1988 | Diesel et al. | 379/211 |
| 4,969,136 | 11/1990 | Chamberlain et al. | 369/29 |
| 5,008,927 | 4/1991 | Weiss et al. | 379/98 |
| 5,008,930 | 4/1991 | Gawrys et al. | 379/210 |
| 5,097,528 | 3/1992 | Gursahaney et al. | 379/218 |
| 5,127,003 | 6/1992 | Doll, Jr. et al. | 370/110.1 |
| 5,168,515 | 12/1992 | Gechter et al. | 379/265 |
| 5,228,073 | 7/1993 | Smith | 379/57 |
| 5,309,512 | 5/1994 | Blackmon et al. | 379/210 |
| 5,309,513 | 5/1994 | Rose | 379/265 |
| 5,317,630 | 5/1994 | Feinberg et al. | 379/94 |
| 5,327,486 | 7/1994 | Wolff et al. | 379/211 |

OTHER PUBLICATIONS

Bob McNinch, "Screen-Based Telephony", IEEE Communications Magazine, Apr., 1990.
Star Talk Set Up and Operation Guide, Sec. 2, "Learning About StarTalk," pp. 2-1-2-7.
"Getting the Message Just Got Easier," *StarTalk*, Northern Telecom. (brochure).
Chris Schmandt and Stephen Casner, "Phonetool: Integrating Telephones and Workstations," *IEEE Communication Society*, Nov. 27-30, 1989, pp. 0970-0974.

Primary Examiner—Jeffery Hofsass
Assistant Examiner—Scott Wolinsky
Attorney, Agent, or Firm—Graybeal Jackson Haley & Johnson

[57] ABSTRACT

A method and apparatus for providing a telephone user with information concerning a caller. The call by the caller causes information concerning the caller to be transferred over a communication channel, separate from the one used by the telephone user, connected to a PC located near the telephone user. The information is displayed in the form of symbols on a PC display, and the telephone user can respond to the information without having to answer the call. If desired, the telephone user can cause the PC to play an audio record concerning the caller. The information displayed can be developed from the caller or from a database, or both.

32 Claims, 7 Drawing Sheets

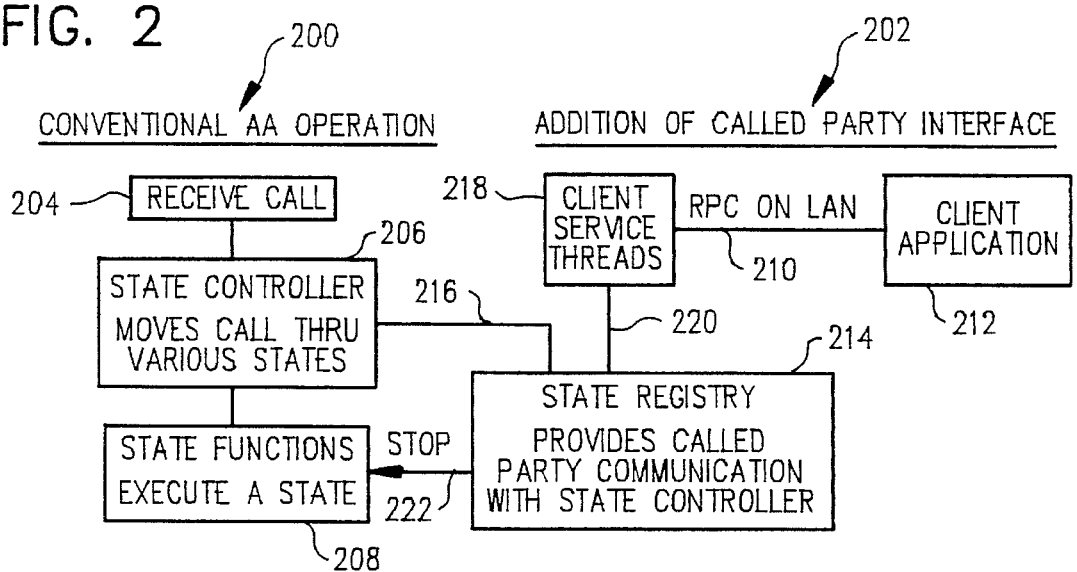
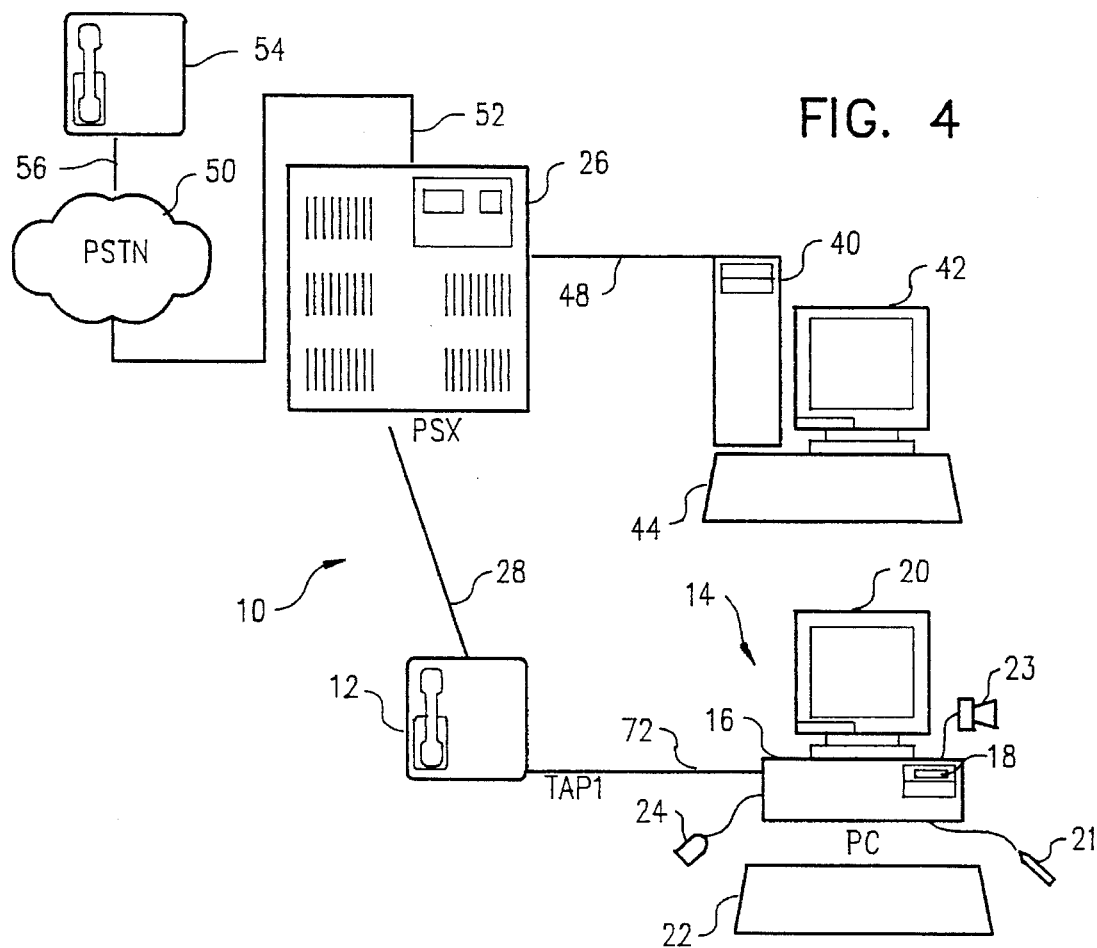

TELEPHONE AUTO ATTENDANT SYSTEM FOR DELIVERING CHOSEN GREETINGS TO CALLERS WHILE ON THE PHONE

This application is a continuation of application Ser. No. 08/125,606, filed Sep. 22, 1993, the benefit of the filing date of which is hereby claimed under 35 USC 120, now abandoned.

TECHNICAL FIELD

This application is related to application Ser. No. 08/119,380 by the same inventors which was issued on Jul. 18, 1995 as U.S. Pat. No. 5,434,906. The present invention relates to systems using a telephone network, and more particularly, to a method and apparatus for providing a telephone user with information concerning a caller, and means for instructing an auto attendant how to handle the call.

BACKGROUND OF THE INVENTION

The advent of the programmable microprocessor has allowed the development of electronic systems which interact with telephone systems that connect to user-operated extension telephones. Such systems are generically referred to as call processors. Typically such systems take the form of a programmed personal computer with additional electronic circuitry that allows the desired interaction with a telephone system. One advantage which such call processor systems provide is to promote better interaction between the users of the telephone system and callers who are connecting into the telephone system from the outside.

Telephone auto attendant systems are well known examples of such call processor systems. Auto attendant systems automatically implement various actions that might be performed by a switch board operator. Auto attendant systems can be implemented from a telephone system central office or, more commonly, in customer premises telephone systems with a private branch exchange (PBX).

The most common feature of auto attendant systems is call routing. For example, when a call is received by the PBX, an auto attendant system answers and plays a message such as "Enter 1 for Sales, 2 for Technical Support, or 3 for Administration;" or "please enter the extension number of the person you wish to talk to. If you do not know the extension, press 99 for a directory." When the requested information is entered, possibly after the caller listens to part or all of a directory, the call processor forwards the call to the designated extension. In this case, the auto attendant is routing the call in place of a live operator. Contemporary telephone systems can also accomplish automatic routing with direct inward dial (DID) or dialed number information services (DNIS).

Some auto attendant systems include a call screening feature which, after the extension is designated by the caller, asks the caller "May I say who is calling?," records any response by the caller, and plays the recording to the called party so the called party can decide whether to take the call. The called party then presses a key to take the call or presses another key to instruct the auto attendant system to play a recording like "Mr. Smith is unavailable, please leave a message . . . ," possibly followed by a further prompt to the calling party.

Some auto attendant systems include a call holding feature which operates if the designated extension is busy. This feature gives the caller the option of being placed on hold and subsequently put through to the called party if the extension becomes available.

In all of the auto attendant systems, communications from the system to the extension owner are via the telephone line(s) and are output to the extension owner by: (1) playing an audio message after the handset is lifted or a key is pressed, (2) ringing the telephone, or (3) illuminating a lamp. The owner communicates with the auto attendant system via the same telephone line(s) by (1) lifting the handset, (2) pressing one of the number keys or other specialized keys on the telephone unit, or (3) hanging up the handset. These limited means of communication cause auto attendant systems to be difficult for extension owners to operate and prevent operation of the system while the extension owner is on the telephone.

In all electronic systems intended for interaction with a telephone system, it is desirable to provide the extension owner with a visual indication of an outside call directed to the owner's extension. While, as described above, it has been known in the past to equip an owner's extension with a light to indicate a call waiting, this has been accomplished through the same communications channel which carries the telephone call to the owner's extension. Further, modern advances in telephone systems have made available additional information concerning the caller which would be useful to the owner in deciding how to handle the telephone call.

It is also desirable to provide the extension owner with a means for redirecting or otherwise handling the telephone call without having to answer the telephone call by establishing a voice path from the owner's telephone to a telephone port of the electronic system or to the caller's telephone. While, as also described above, it has been known in the past to prompt the user with knowledge that the call is waiting and its status (e.g., that the telephone caller has been placed on hold), much more flexibility in user telephone call handling is possible if the user can be presented with additional information concerning the caller and means for instructing the auto attendant how to handle the call.

SUMMARY OF THE INVENTION

The present invention provides, by economical means, a superior user interface for auto attendant systems which operates via an additional communications link between the extension owner and the system. The extension owner's user interface attached to the additional communications link includes a visual display capable of alpha-numeric output and one or more physical devices for input by any of the known computer input methods, including a keypad with a few keys, a full keyboard with all alphabetic and numeric characters and/or a pointing device for selecting items displayed on the display. The user interface attached to the additional communications link may also include a speaker for sound output and/or a microphone for sound input. By using a second communications link, the owner can receive information from the system and control the system while the owner is on the telephone. The display of incoming call information can be read by the owner much more quickly than the same information can be played in audio form, and, because it is silent, it will not interfere with a telephone or other conversation.

The visual display can also be used to convey much more information than can feasibly be accomplished by voice. For example, once the caller has been identified, perhaps by ANI or CID or by the caller entering touch tones in response to a prompt, in addition to displaying the identity of the caller, the system can display to the extension owner screen fulls of information about the caller. Also, many more options for handling the call can be presented to the called party than would be feasible with voice prompts.

According to one aspect, the invention is a method for a first caller to communicate with a user of a telephonic system, the user already being engaged in a telephonic conference on a telephone with a second caller over a first telephonic communication channel when the first caller begins to attempt to communicate with the user. The method generally comprises the steps of a) establishing a second bidirectional communication channel between the user and the telephonic system, and b) transmitting a message from the telephonic system to the user over the second communication channel, the message including visual symbols representing information concerning the telephonic call from the first caller.

According to another aspect, the invention is a method for a first caller to communicate with a user of a telephonic system, the user having a telephone connected to the telephonic system through a first telephonic communication channel. The method comprises the steps of a) establishing a second bidirectional communication channel between the user and the telephonic system and b) transmitting a message from the telephonic system to the user over the second communication channel, the message including visual symbols representing information concerning the telephonic call from the first caller.

According to a further aspect, the invention is an apparatus to enable a first caller to communicate with a user of a telephonic system, the user already being engaged in a telephonic conference on a telephone with a second caller over a first telephonic communication channel when the first caller begins to attempt to communicate with the user. The apparatus comprises means for establishing a second bidirectional communication channel between the user and the telephonic system and means for transmitting a message from the telephonic system to the user over the second communication channel, the message including visual symbols representing information concerning the telephonic call from the first caller.

BRIEF DESCRIPTION OF THE DRAWINGS

FIG. 2 is a schematic diagram of the operation of a conventional auto-attendant system together with the operation of the additional system for coordinating the called party commands with the on-going conversation.

FIG. 4 is a schematic diagram showing an alternative embodiment for carrying out the invention.

DETAILED DESCRIPTION OF THE INVENTION

Figure 1:
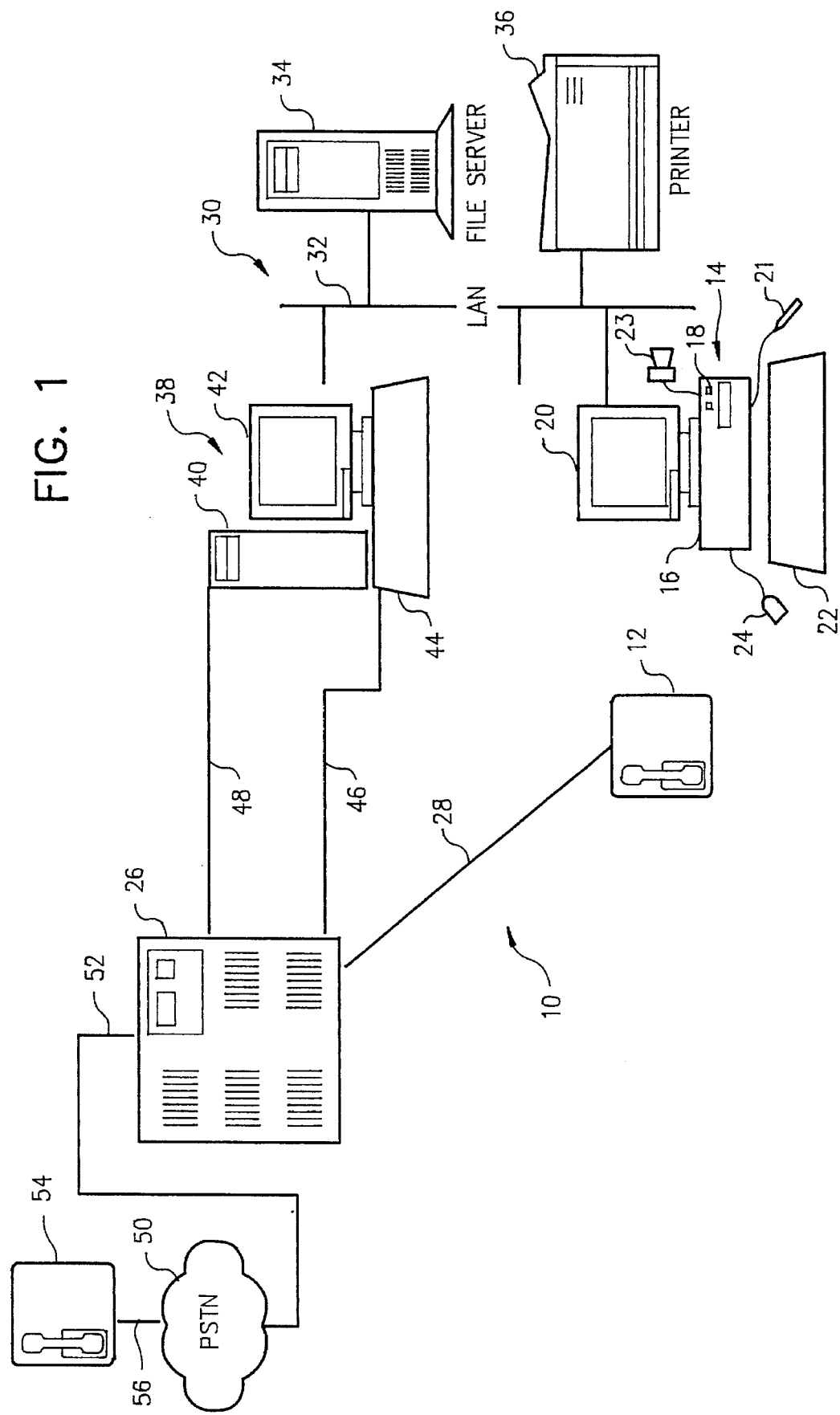
FIG. 1 is a schematic diagram showing a preferred embodiment for carrying out the invention.

FIG. 1 is a schematic diagram showing a preferred embodiment for carrying out an aspect of the invention. The preferred embodiment of the apparatus 10 includes a user's telephone extension 12 and a programmed personal computer 14 located near the user's telephone extension 12. The programmed personal computer 14 includes a housing 16 that encloses a conventional microprocessor (such as an Intel 486 microprocessor, not shown) and other conventional electronic circuitry associated with the microprocessor. The housing 16 also encloses one or more disk drives, including a floppy disk drive 18 and a hard disk drive (not shown) that contains the program which the microprocessor is executing as well as data which the program requires while it is executing. The programmed personal computer 14 also includes a display 20, a keyboard 22, a speaker 23, a microphone 21 and a pointing device 24, such as a mouse. The display 20, the keyboard 22 and the pointing device 24 are all connected to the housing 16 through conventional cables (not shown).

When the user for the user extension telephone 12 is in the vicinity of the telephone 12 and the programmed personal computer 14, it is possible for the user to use the telephone 12, to operate the programmed personal computer 14 through the keyboard 22 and to observe the display 20. If the user is using the preferred embodiment of the claimed apparatus, the user can use the programmed personal computer 14 to see information concerning callers who are calling the user's extension telephone 12 and to issue commands to the programmed personal computer 14 to handle the telephone calls by the callers.

The telephone 12 of the system 10 is connected to a private branch exchange (PBX) 26 through a first communication channel 28 that can carry the voice of a caller to the user. The programmed personal computer 14 is connected to a local area network (LAN) 30 that includes an interconnecting bus 32 to which other devices such as a file server 34, a printer 36 and a call processor system 38 are connected. The interconnecting bus 32 facilitates communications among the file server 34, the printer 36 and the call processor system 38 in accordance with conventional LAN operation. The programmed PC 14 and the call processor system can communicate directly with each other using a client-server or peer-to-peer protocol, such as remote procedure calls. Among the many articles which discuss the use of RPCs to provide communications protocols such as LANS is "Middleware: Unearthing a Software Treasure Trove," by David Baum, published in InfoWorld magazine, vol. 14, no. 48, p. 46, Nov. 30, 1992. This communications protocol incorporates a remote procedure call (RPC) over Named Pipes or net Bios.

The call processor system 38 includes a programmed personal computer 40 with a voice board, such as supplied by Dialogic of New Jersey or Rhetorex of California (not shown), a display 42, and a keyboard 44 which are connected to the programmed personal computer 40 in a conventional manner. The personal computer 40 is programmed to cause the call processor system 38 to function as an auto attendant and a voice mail system. The voice board inside the computer 40, in turn, is connected to the PBX 26 through a bidirectional link 48 that carries telephone PBX signalling and voice data.

Optionally, the call processor system 38 and the PBX 26 can also be interconnected with a bidirectional digital link 46. The bidirectional link 46 can, for example, be specified according to the open application interface (OAI) such as those which have been described in a series of articles during 1992 in Teleconnect magazine. For example, this bidirectional link might be implemented using the CSTA protocol published by European Computer Manufacturer's Association (ECMA).

The bidirectional link 48, (with or without the OAI link 46,) and the interconnecting bus 32 form a second, bidirectional communication channel that carries information between the PBX 26 and the user.

The PBX 26 is connected to the public switched telephone network (PSTN) 50 through a standard telephone line 52. The telephone network 50 can be accessed by a caller from the outside telephone 54 through the line 56.

As described above, in conventional auto-attendant systems, a caller interacts with the system through a "conversation" which consists of voice playback from the auto-attendant system and DTMF, voice, or other input from the caller. The conversation consists of individual "states" where each "state" is a single exchange between the auto-attendant and the caller (the auto-attendant plays a prompt to the caller, and the caller optionally responds with a DTMF or voice command). The conversation proceeds through these states according to a pre-defined sequence, allowing for control of the system by the caller. This sort of operation is well understood and widely used in auto-attendants today.

A complication arises with the introduction of a second channel of communication from the auto-attendant system to the called party. This introduces the possibility that the called party may, via the second channel, interrupt the ordinary flow of the conversation and direct the auto-attendant to say something different to the caller at any time, effectively instructing the auto-attendant to move directly to a different state than it otherwise would.

FIG. 2 is a schematic diagram of the operation of a conventional auto-attendant system 200 together with the operation of an additional system 202 for coordinating the called party commands with the on-going conversation.

In the conventional auto-attendant system 200, the call is received (block 204), and the conversation is controlled by some state controller 206 which calls various state functions (block 208) to execute individual states with the caller. Each state function 208 performs its task and returns the results to the state controller 206. The state controller 206 determines which state to execute next, based on the pre-defined sequence of the conversation and the results of the previous state.

The first requirement for the added called party interface 202 is some form of communication link from the caller to the called party. In the preferred embodiment, the communications link to the called party is accomplished via Remote Procedure Calls (RPC) 210 over a Local Area Network (LAN) to an application program running on the called party's personal computer (PC) 212.

The application on the PC 212 can then interact with the auto-attendant system 200 via an Application Programming Interface (API) described below. The called party API includes the functions described below which meet three requirements:

1) To allow a called party to "log on to" or "establish a session with" the auto-attendant system 200 to indicate that the called party wants to be notified of incoming calls and optionally to send the auto-attendant system 200 commands to handle the call(s), and to "log out" or "terminate a session."

2) To notify the called party of incoming calls, including caller identification, and continue to notify the called party of the progress of the call through various states. When a session is established, the called party application registers the address of a callback function with the auto-attendant system 200. The callback function is used by the auto-attendant system 200 to notify the called party about incoming calls and call states. The auto attendant system 200 invokes the callback function each time an incoming call for the called party enters a new state. Each notification includes a "call handle" to identify the call to which the notification applies. When the called party application first sees a new call handle, it logs a new call. Notifications also include a pointer to a location in memory from which the called party application can retrieve information collected about the caller, including phone number, name, a recording made of the caller's voice, or responses given by the caller in DTMF tones to queries posed by the auto attendant. The notification also includes a value indicating the current state of the call.

3) To allow the called party to send commands to the auto-attendant system 200 to affect the flow of the caller conversation, such as a change state command. Commands from the called party application to the auto attendant system include a pointer to a call handle, a value indicating the state the called party wishes to move the call to, and a pointer to a block of parameters with additional information about the state to be moved to, such as an indication of which of several greetings the called party would like to have played to the caller.

All of the functions in the API return a success code to indicate that the function succeeded or a failure code to indicate the function failed and the reason for the failure. Each of these codes has a defined meaning for each function. For example, the change state command returns zero (0) to indicate the command was accepted by the auto-attendant system 200, one (1) to indicate that the command was rejected by the auto-attendant system 200 because the call has terminated (the caller hung up), or other values to indicate other reasons for the command being rejected by the auto-attendant system 200, or other reasons for failure of the function, such as the LAN communication being lost.

The coordination of the called party interface with the conventional conversation interface is accomplished through a "state registry" object 214. Whenever a called party establishes a session with the auto-attendant system 200, the state registry object 214 logs that called party in to be notified of any calls and any call state changes for that called party.

The state controller 206 in the conventional conversation notifies the state registry object 214 of each new call received and each state transition for each call (path 216). At the conclusion of each call state, the state controller 206 also queries the state registry object 214 to see if the called party has requested a state change.

When the state registry object 214 receives notification of a call state change from the state controller 206, it checks whether the called party has established a session to receive call notification. If so, it invokes the callback function to notify the called party of the call state change, using a separate "client service thread" 218 (via path 220), to avoid holding up the execution of the state controller's process.

When the state registry object 214 receives a request to change the state of a call from the called party (via the client service thread 218), the state registry object 214 stores the state change request and delivers it to the state controller 206 when the state controller 206 queries for it at the conclusion of the current call state.

In order to speed the execution of called party state change requests, the state registry object 214 may also send a signal or command to the function executing the current state (path 222) to tell it to stop executing the current state and return immediately to the state controller 206.

This structure of separate client service threads 218 and the separate state controller 206 communicating via the state registry object 214 allows the called party RPC interface 210 and the caller conversation to proceed independently, but also allows for coordination of called party commands with the caller's conversation.

When in use, the system 10 (see FIG. 1) will operate as follows. A caller at the outside telephone 54 will dial the telephone number of the user, which will connect the outside telephone 54 to the telephone network 50 through the line 56. The network 50 will then connect the outside telephone 54 to the PBX 26 through the line 52. The PBX 26 will cause the caller on the outside telephone 54 to interact with the call processor system 38 which performs the functions of an auto attendant system. After the auto attendant system 38 has handled the telephone call from the caller, it will display appropriate information on the display 20 of the programmed personal computer 14, for the user to read.

Figure 3:
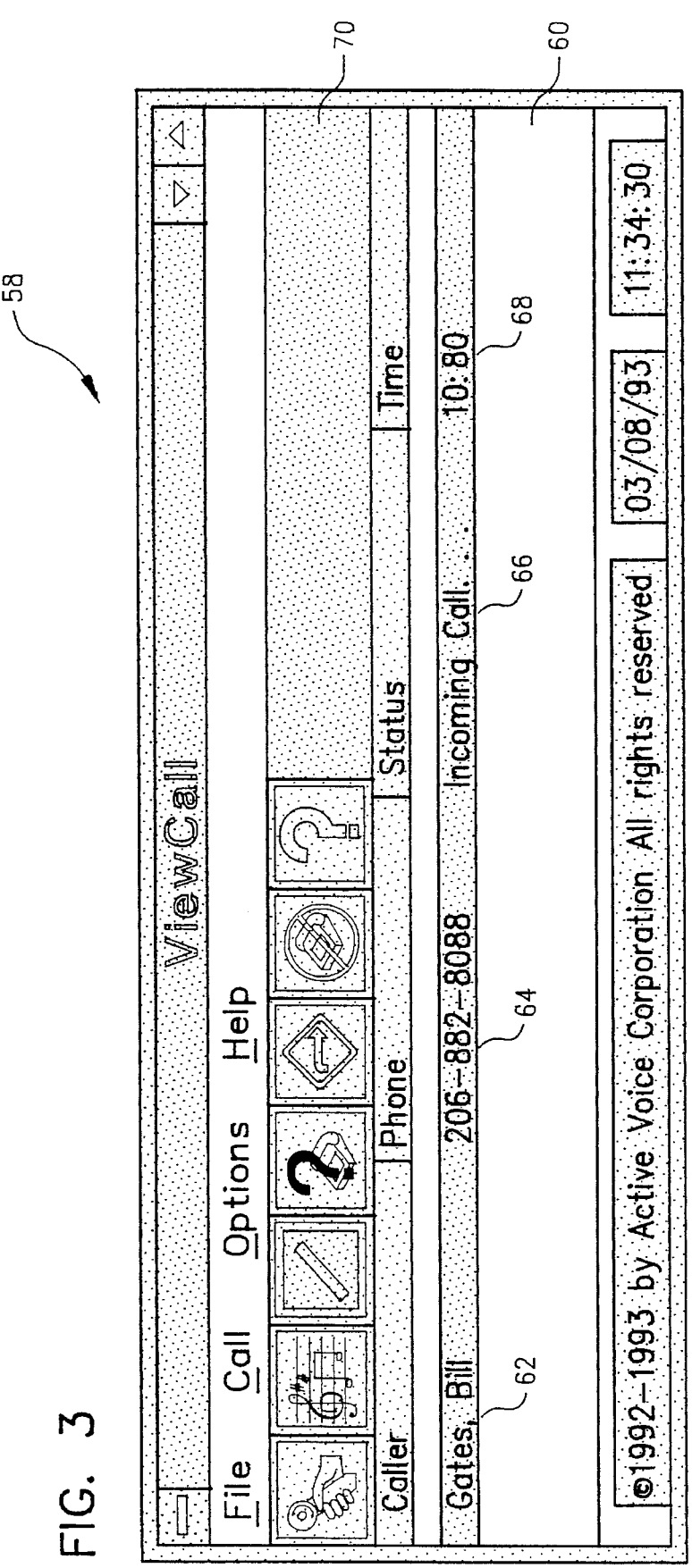
FIG. 3 is a view of a window which is produced in the use of the apparatus of the preferred embodiment for carrying out an aspect of the invention.

FIG. 3 is a view of a window which is produced in the use of the apparatus of the preferred embodiment for carrying out an aspect of the invention. The window 58 is shown on the display 20 of the programmed personal computer 14, when the programmed personal computer 14 is running under Windows 3.1, as produced by Microsoft Corporation of Redmond, Wash. The window 58 includes an information area 60, which is used to provide a description of the caller, including a name in the caller section 62, a telephone number in the phone section 64, the current status of the call in the status section 66 and the time of the call in the time section 68. The window 58 also includes a number of icons in a toolbar 70. The icons represent different actions that can be taken by the user with respect to the call in the information area 60 which the user has highlighted by using the pointing device 24.

If desired, the user can choose the icon representing speech to hear through the speaker 23 a reproduction of a message from the caller recorded by the auto attendant system 38 when the caller was interacting with the auto attendant system 38. When it comes from the PBX on voice line 48, the speech is transformed to digital form under the Dialogic adaptive differential pulse code modulation (ADPCM) algorithm (available from Dialogic Corporation, Parsippany, N.J.) and stored in memory. For transmission across the network, the voice data is converted to the file format specified by Waveform Audio File Format specification provided by Microsoft Corporation. The speech file can then be retrieved by the user's personal computer 14 and played according to the multimedia file format specifications of the Microsoft Windows environment. These file format specifications are described in the Multimedia Programmer's Reference, available from the Microsoft Corporation, Redmond, Wash.

Furthermore, the programmed PC 14 can access a database to obtain further information concerning the caller and can display the information. The further information can either be provided by the call processor 38 in accordance with the circumstances of the telephone call or by reference to a database included in the call processor 38, the programmed personal computer 14, or in a file server 34.

As further alternatives, the user can select an icon which causes the telephone call placed by the caller to be handled in some other way. These further alternatives include placing the caller on hold (or continuing to maintain the caller on hold) or transferring the call to another extension.

FIG. 4 is a schematic diagram showing an alternative embodiment for carrying out an aspect of the invention. In this embodiment, those parts of the apparatus which are unchanged from those described as being part of the preferred embodiment are given the same reference number. Therefore, the only new component in the alternative embodiment of the apparatus of the system is the bidirectional link 72, which connects the user's telephone 12 with the programmed personal computer 14 and forms an alternative bidirectional second communication channel between the PBX 26 and the programmed personal computer 14 through the user's telephone 12.

The information upon which the programmed personal computer 14 operates in order to provide information concerning telephone calls to the user's extension telephone 12 is passed to the programmed personal computer 14 from the PBX 26, through the link 28, the extension telephone 12, and the bidirectional link 72. This information is used to produce displays such as the window shown in FIG. 3.

Figure 5:
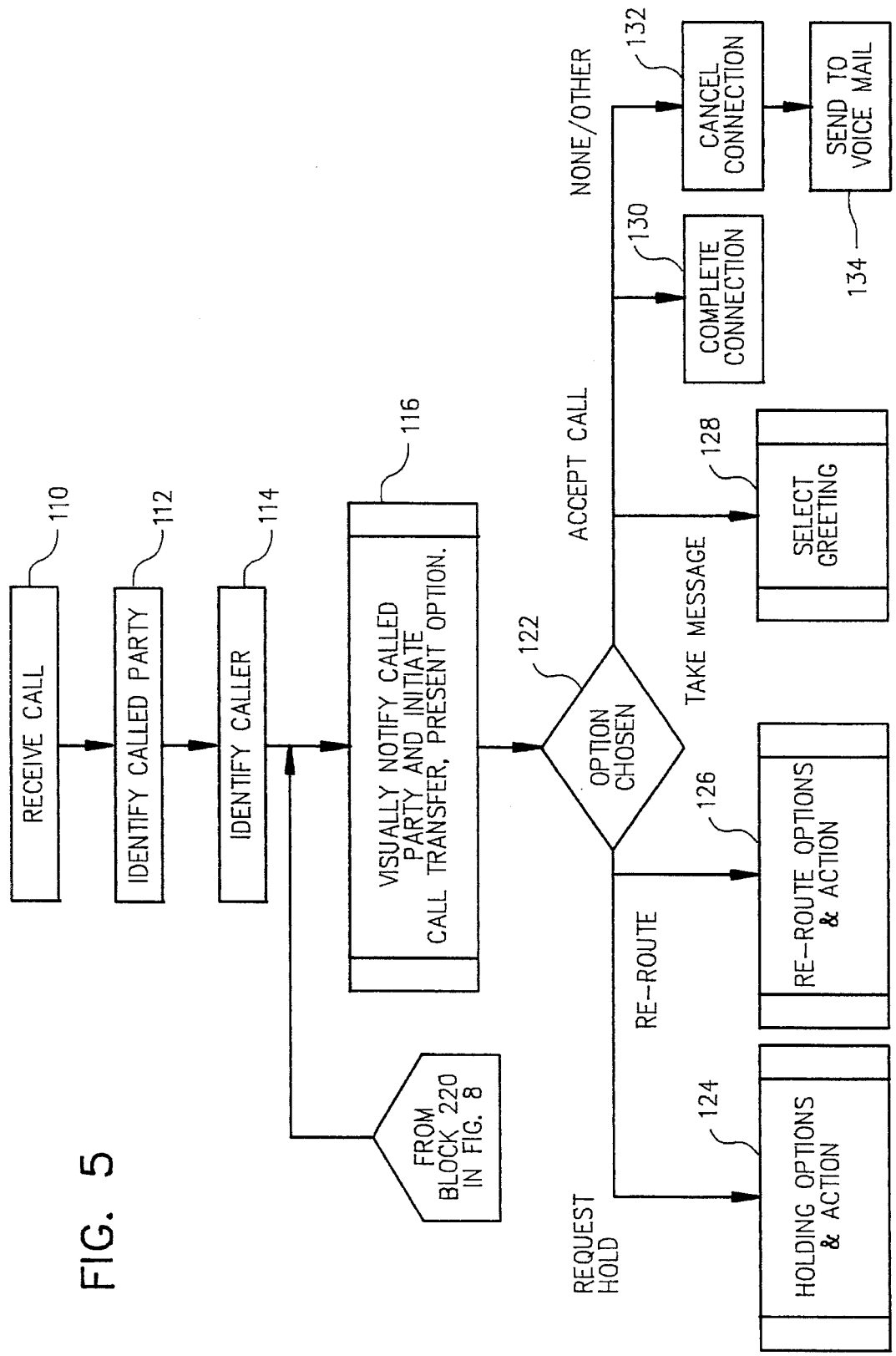
FIG. 5 is a flow chart of the overall operation of the apparatus in accordance with the preferred embodiment of the present invention.

FIG. 5 is a flow chart of the overall operation of the apparatus in accordance with the preferred embodiment of the present invention. In operation, the apparatus 10 receives the call placed by the caller (block 110). This may be accomplished by either taking the line through which the connection is made off-hook or establishing a digital link through the line 56 between the caller's phone 54 and the telephone network 50, and the line 52 between the telephone network 50 and the PBX 26. Also, the apparatus 10 identifies the called party (block 112). This can be accomplished by various means. For example, the called party can be identified 1) in response to a voice prompt produced when the caller keys in a dual-tone multifrequency (DTMF) input to the apparatus 10, 2) by applying voice recognition to the caller's voice, or 3) by using digital identification schemes such as direct inward dialed (DID) or dial number identification service (DNIS). Also, the apparatus 10 identifies the caller (block 114) by various means. Caller identification may be accomplished by automated voice recognition of the caller's voice or by a voice prompt followed by either recording of the caller's answer or receiving DTMF tones entered by the caller. Caller identification may also be accomplished by automatic number identification (ANI) or other conventional caller identification schemes.

The call answering and identification stage includes the first three steps (represented by blocks 110, 112 and 114). These steps can be performed in any order. For example, with ANI and DNIS, the information about both the caller and the called party can be collected before the call is actually answered.

After completing the call answering and identification stage, the apparatus 10 visually notifies the called party and initiates call transfer (block 116). The visual notification announces the call to the called party and presents the called party with options. These options may include 1) for the apparatus 10 to ask the caller to hold, 2) for the apparatus 10 to reroute the call to a substitute called party designated to accept the call, 3) for the apparatus 10 to take a message from the caller, and 4) for the called party to accept the call. The called party may choose one of these options or not (block 122). Depending upon the option chosen (if any), the apparatus 10 exercises holding options and actions (block 124), exercises rerouting options and actions (block 126), takes a message (block 128), or passes the call to the called party (block 130). If the called party does not choose an option, the apparatus 10 cancels the connection (block 132) and transfers the call to the voice mail subsystem of the call processor system 38 (block 134). The voice mail system 38 may be separate from or may be a subsystem of the call processor.

Figure 6:
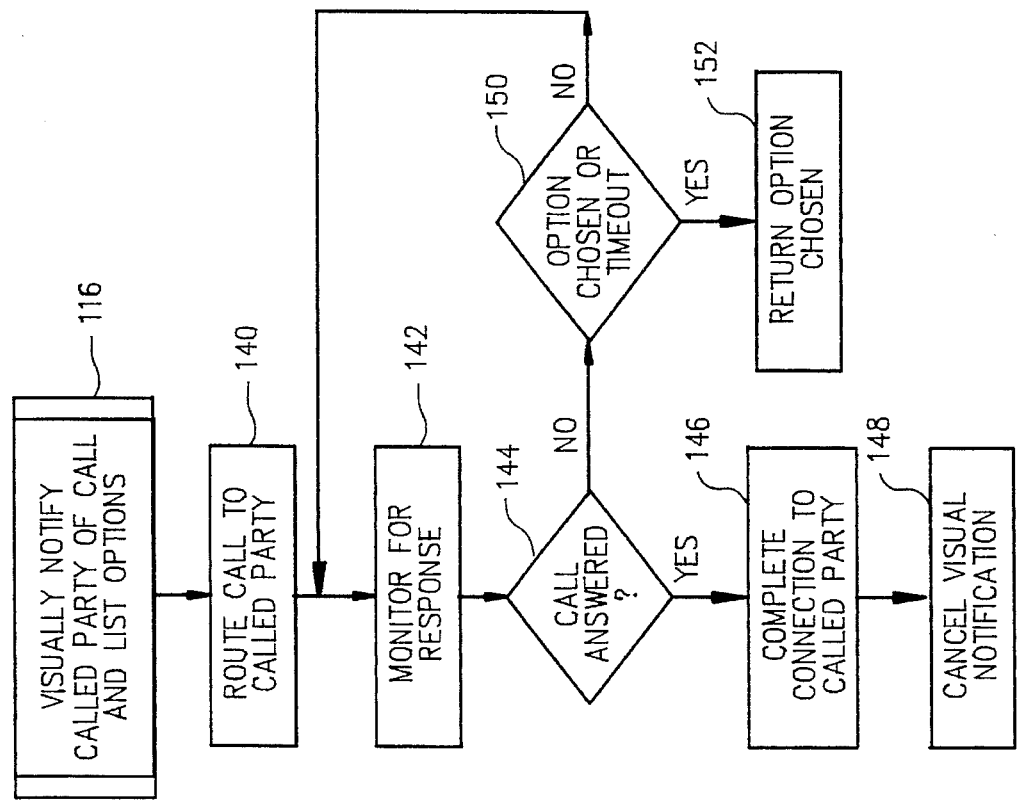
FIG. 6 is a flow chart of the actions of the apparatus in accordance with the preferred embodiment of the present invention when the apparatus is attempting to connect to a called party.

FIG. 6 is a flow chart of the actions of the apparatus in accordance with the preferred embodiment of the present invention when the apparatus is attempting to notify the called party and initiate call transfer to the called party. First, the apparatus 10 uses the second communication channel to send visual notification to the called party. This corresponds to block 116 in FIG. 4. The notification can take place over the LAN 30 (in accordance with the preferred embodiment), or over a display, such as a liquid crystal display (LCD), of the sort which is commonly found on business system telephones. Next, the apparatus 10 routes the call to the called party (block 140). This can be accomplished by issuing a hookflash with DTMF tones, by a digital switch command or by direct connection to the called party's extension. Next, after the connections are initiated, the apparatus 10 monitors both communication channels for a response (block 142). A response by the called party to the initiated connection can be recognized as a LAN client response, by digital switch information analysis or if the call is answered. If there is an answer (block 144), the apparatus 10 completes the connection to the called party (block 146) and cancels the visual notification (block 148). Otherwise, the apparatus 10 checks to determine whether an option has been chosen or if a timeout has occurred (block 150). If it has, the apparatus returns to block 122 (see FIG. 5) and executes the option chosen (block 152). Otherwise, the apparatus 10 continues to monitor for response (block 142).

Figure 7:
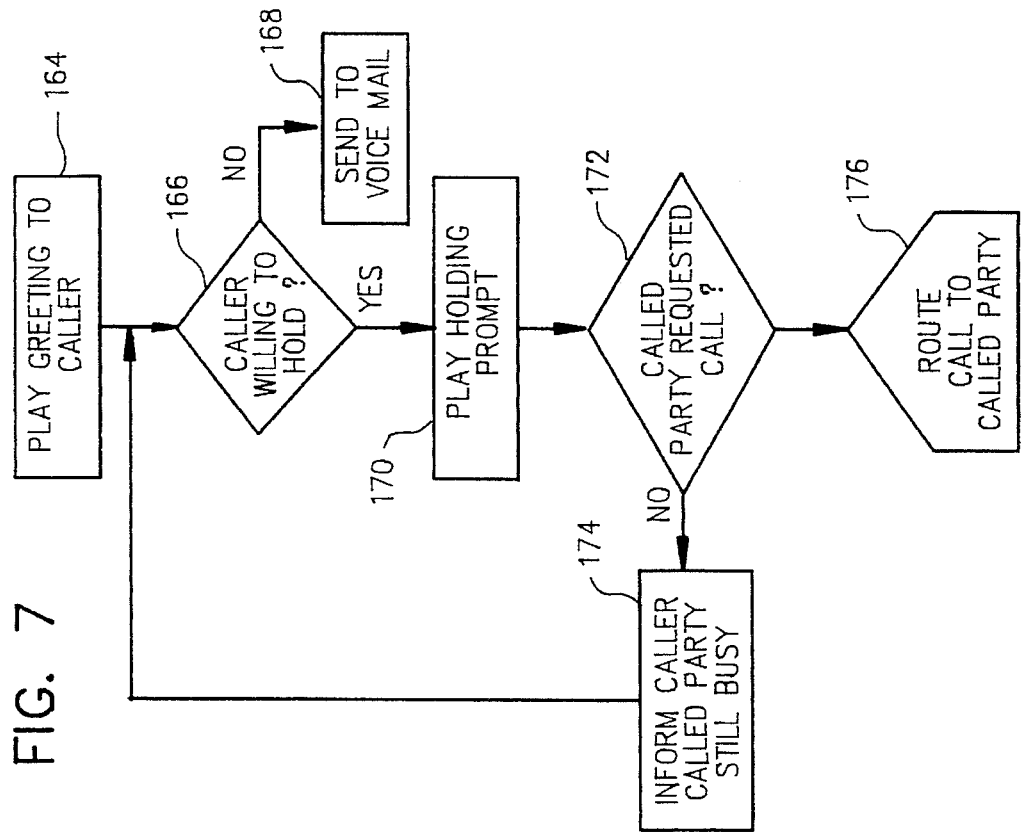
FIG. 7 is a flow chart of the holding options and actions of the apparatus in accordance with the preferred embodiment of the present invention.

FIG. 7 is a flow chart of the holding options and actions of the apparatus in accordance with the preferred embodiment system of the present invention. These options and actions are taken if the called party requests the apparatus 10 to offer the caller the opportunity to hold (block 124, FIG. 4). In this case, the apparatus 10 plays the greeting (chosen by the called party) to the caller (block 164). Next the auto answer system begins to periodically inquire whether the caller is willing to hold (block 166). This could be either a hold within the apparatus 10 or the PBX system 26. If the caller is no longer willing to continue to hold, the apparatus 10 transfers the caller to voice mail (block 168). If, however, the caller is still willing to continue to hold, the apparatus 10 plays a holding prompt to the caller (block 170). The apparatus 10 then inquires of the called party's line whether the called party has requested to be connected to the call (block 172). If not, the apparatus 10 informs the caller that the called party is still busy (block 174) and returns to block 166 to inquire whether the caller is still willing to hold. If the called party has requested to be connected to the call, the apparatus 10 routes the called party of the caller's call (block 176; also block 40, FIG. 5).

Figure 8:
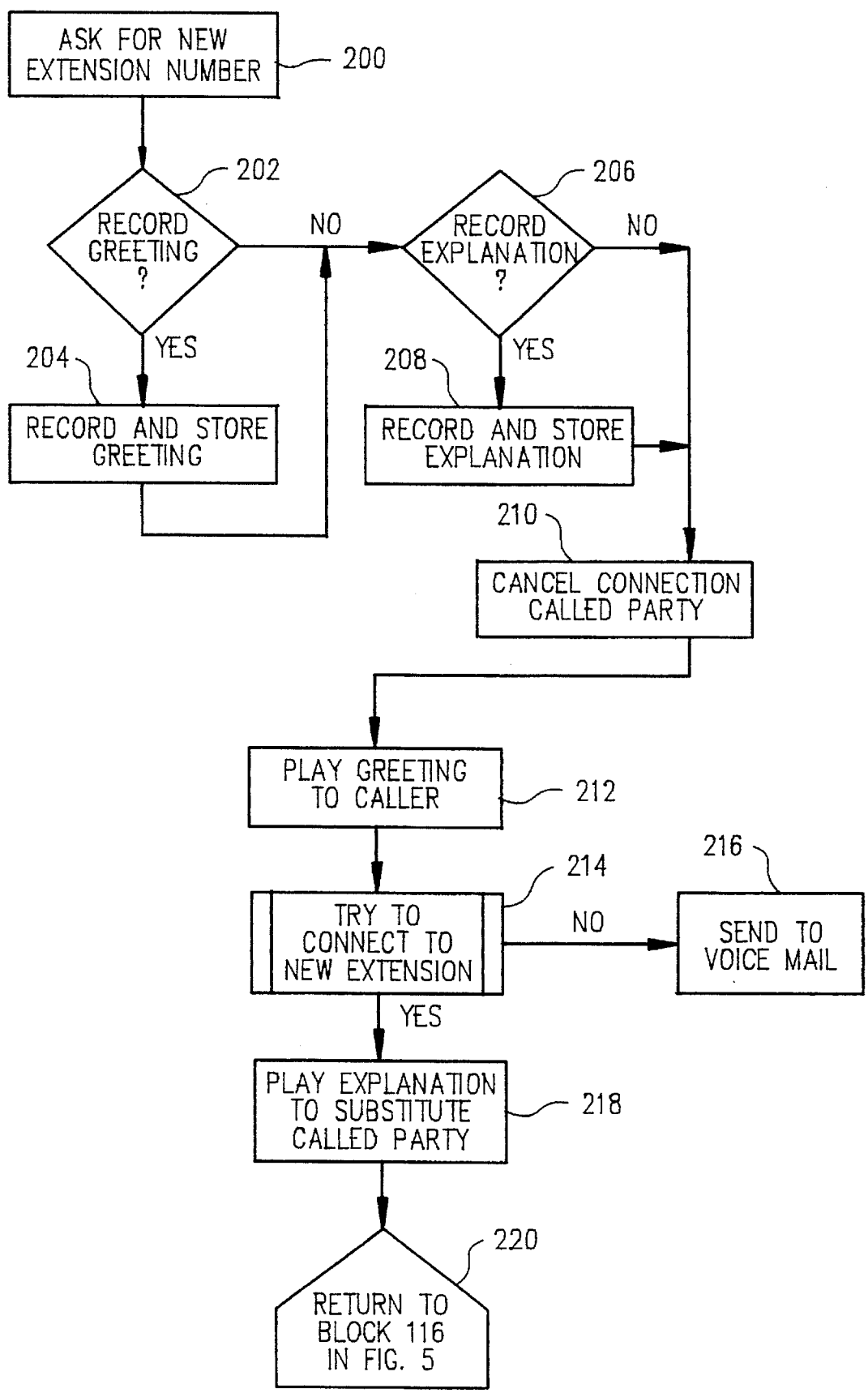
FIG. 8 is a flow chart of the reroute options and actions of the apparatus in accordance with the preferred embodiment system of the present invention.

FIG. 8 is a flow chart of the reroute options and actions of the apparatus in accordance with the preferred embodiment system of the present invention. These options and actions are taken if the called party requests the apparatus 10 to reroute the call (block 126, FIG. 5). Initially in this stage, the apparatus 10 asks the called party for the extension number of another extension owner who is designated as the substitute called party (block 200) and inquires whether the called party wishes to record a greeting to the caller (block 202). If the called party wishes to record a new greeting, the called party is prompted for a greeting which is then received and stored in the apparatus 10 (block 204). This could be accomplished, for example, using one audio input device 21 compliant with the Microsoft Windows 3.1 multimedia specification. In any case, the called party is then offered an opportunity to record an explanation to play to the substitute called party whose extension number was supplied by the original called party (block 206). If the called party wishes to offer an explanation to the substitute called party, the apparatus 10 prompts the called party for the explanation and records it (block 208). Those skilled in the art will recognize that the set of operations described in connection with blocks 202 and 204 are independent of the set of operations described in connection with blocks 206 and 208. The one set of operations can be performed with or without performing the other set of operations. Accordingly, the blocks 202 and 206 and the blocks 204 and 208 can be exchanged in the flow chart of FIG. 8 without affecting the overall operation of the preferred embodiment of the invention.

Regardless of whether a greeting and/or explanation are recorded by the called party, the apparatus 10 then cancels the connection to the called party (block 210) and plays the greeting (if recorded) to the caller (block 212). Subsequently, the apparatus 10 attempts to connect to the substitute extension number supplied by the called party in block 200 (block 214). This action is the same as the action described in block 116, FIG. 5 and detailed in FIG. 6, such that the substitute called party may receive visual notification and have options just as the original called party. If the attempt to connect to the substitute extension number is unsuccessful, the apparatus 10 transfers the caller to voice mail (block 216). If the connection to the substitute extension number is successful, the explanation recorded (if any) by the called party at block 206 is played to the substitute called party (block 218). The substitute called party is now substituted for the original called party and the apparatus 10 returns to block 116 in FIG. 5, to announce the call and offer options to the substitute called party (block 220).

Figure 9:
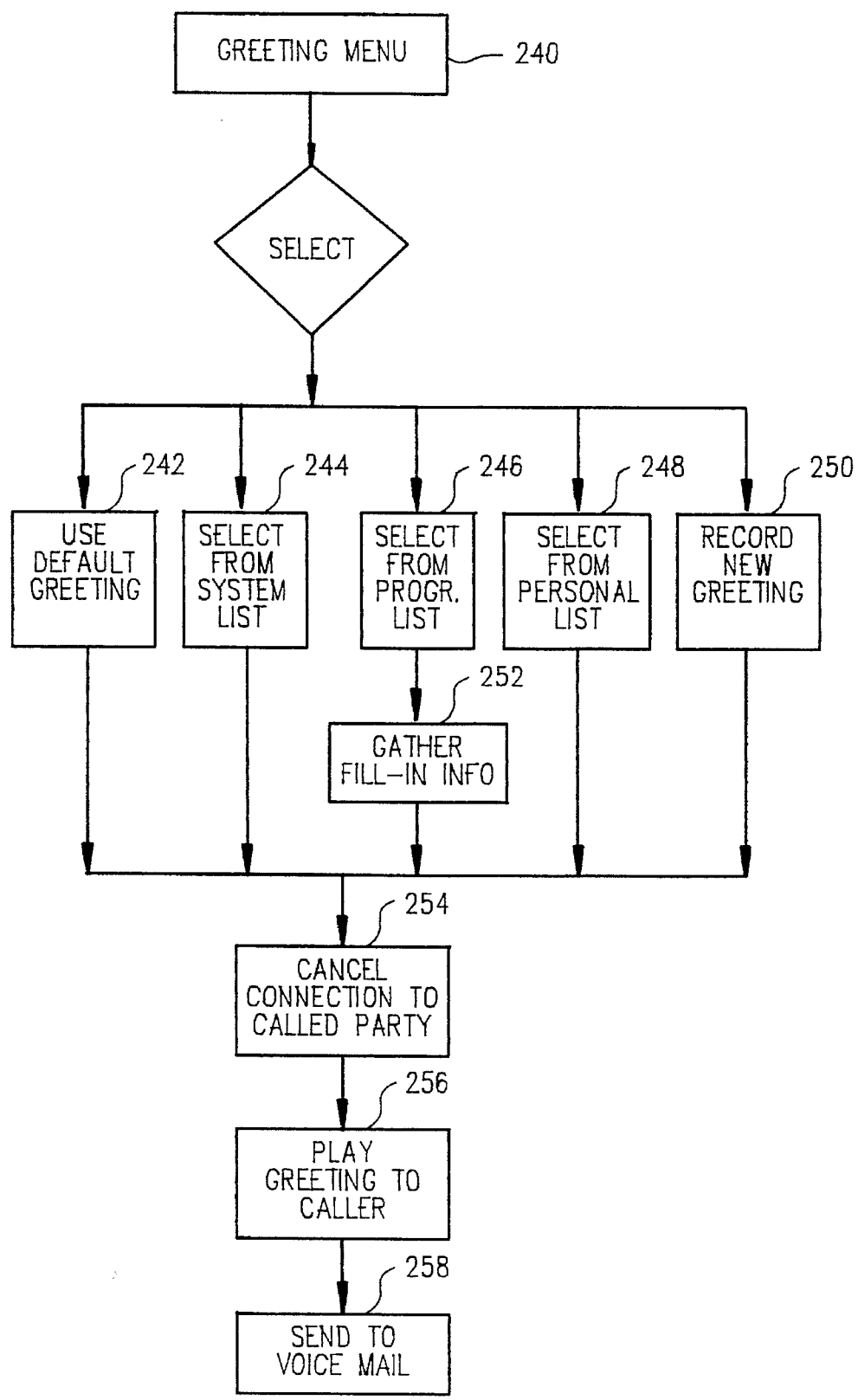
FIG. 9 is a flow chart of the select greeting action of the apparatus in accordance with the preferred embodiment of the present invention.

FIG. 9 is a flow chart of the select greeting action of the apparatus in accordance with the preferred embodiment of the present invention. The select greeting action is taken if the called party instructs the apparatus 10 to take a message. At this point, the apparatus 10 offers a number of greeting choices to the called party (block 240). These greetings can include a default greeting (block 242), a general system greeting (block 244), a programmable greeting (block 246), a personal greeting (block 248), or a new greeting (block 250). The programmable greeting includes fill-in information, such as the time of day, which the called party can supply (block 252) to complete the programmable message as appropriate. The personal greeting is selected from a list of greetings previously recorded by the called party. The new greeting can be recorded specifically as a greeting to the caller. After the appropriate greeting is selected by the called party (blocks 242, 244, 246, 248, 250 and 252), the connection to the called party is cancelled.

As described above, in conventional auto-attendant systems, a caller interacts with the system through a "conversation" which consists of voice playback from the auto-attendant system and DTMF, voice, or other input from the caller. The conversation consists of individual "states" where each "state" is a single exchange between the auto-attendant and the caller (the auto-attendant plays a prompt to the caller, and the caller optionally responds with a DTMF or voice command). The conversation proceeds through these states according to a pre-defined sequence, allowing for control of the system by the caller. This sort of operation is well understood and widely used in auto-attendants today.

A complication arises with the introduction of a second channel of communication from the auto-attendant system to the called party. This introduces the possibility that the called party may, via the second channel, interrupt the ordinary flow of the conversation and direct the auto-attendant to say something different to the caller at any time, effectively instructing the auto-attendant to move directly to a different state than it otherwise would.

FIG. 1 is a schematic diagram of the operation of a conventional auto-attendant system 200 together with the operation of an additional system 202 for coordinating the called party commands with the on-going conversation.

In the conventional auto-attendant system 200, the call is received (block 204), and the conversation is controlled by some state controller 206 which calls various state functions (block 208) to execute individual states with the caller. Each state function 208 performs its task and returns the results to the state controller 206. The state controller 206 determines which state to execute next, based on the pre-defined sequence of the conversation and the results of the previous state.

The first requirement for the added called party interface 202 is some form of communication link from the caller to the called party. In the preferred embodiment, the communications link to the called party is accomplished via Remote Procedure Calls (RPC) 210 over a Local Area Network (LAN) to an application program running on the called party's personal computer (PC) 212.

The application on the PC 212 can then interact with the auto-attendant system 200 via an Application Programming Interface (API) described below. The called party API includes the functions described below which meet three requirements:

1) To allow a called party to "log on to" or "establish a session with" the auto-attendant system 200 to indicate that the called party wants to be notified of incoming calls and optionally to send the auto-attendant system 200 commands to handle the call(s), and to "log out" or "terminate a session."

2) To notify the called party of incoming calls, including caller identification, and continue to notify the called party of the progress of the call through various states. When a session is established, the called party application registers the address of a callback function with the auto-attendant system 200. The callback function is used by the auto-attendant system 200 to notify the called party about incoming calls and call states. The auto attendant system 200 invokes the callback function each time an incoming call for the called party enters a new state. Each notification includes a "call handle" to identify the call to which the notification applies. When the called party application first sees a new call handle, it logs a new call. Notifications also include a pointer to a location in memory from which the called party application can retrieve information collected about the caller, including phone number, name, a recording made of the caller's voice, or responses given by the caller in DTMF tones to queries posed by the auto attendant. The notification also includes a value indicating the current state of the call.

3) To allow the called party to send commands to the auto-attendant system 200 to affect the flow of the caller conversation, such as a change state command. Commands from the called party application to the auto attendant system include a pointer to a call handle, a value indicating the state the called party wishes to move the call to, and a pointer to a block of parameters with additional information about the state to be moved to, such as an indication of which of several greetings the called party would like to have played to the caller.

All of the functions in the API return a success code to indicate that the function succeeded or a failure code to indicate the function failed and the reason for the failure. Each of these codes has a defined meaning for each function. For example, the change state command returns zero (0) to indicate the command was accepted by the auto-attendant system 200, one (1) to indicate that the command was rejected by the auto-attendant system 200 because the call has terminated (the caller hung up), or other values to indicate other reasons for the command being rejected by the auto-attendant system 200, or other reasons for failure of the function, such as the LAN communication being lost.

The coordination of the called party interface with the conventional conversation interface is accomplished through a "state registry" object 214. Whenever a called party establishes a session with the auto-attendant system 200, the state registry object 214 logs that called party in to be notified of any calls and any call state changes for that called party.

The state controller 206 in the conventional conversation notifies the state registry object 214 of each new call received and each state transition for each call (path 216). At the conclusion of each call state, the state controller 206 also queries the state registry object 214 to see if the called party has requested a state change.

When the state registry object 214 receives notification of a call state change from the state controller 206, it checks whether the called party has established a session to receive call notification. If so, it invokes the callback function to notify the called party of the call state change, using a separate "client service thread" 218 (via path 220), to avoid holding up the execution of the state controller's process.

When the state registry object 214 receives a request to change the state of a call from the called party (via the client service thread 218), the state registry object 214 stores the state change request and delivers it to the state controller 206 when the state controller 206 queries for it at the conclusion of the current call state.

In order to speed the execution of called party state change requests, the state registry object 214 may also send a signal or command to the function executing the current state (path 222) to tell it to stop executing the current state and return immediately to the state controller 206.

This structure of separate client service threads 218 and the separate state controller 206 communicating via the state registry object 214 allows the called party RPC interface 210 and the caller conversation to proceed independently, but also allows for coordination of called party commands with the caller's conversation. (block 254) and the greeting which has been selected is played to the caller (block 256). If appropriate, the caller is then sent to voice mail (block 258) to leave a message for the called party.

While the foregoing description has explained the method of the preferred embodiment of the invention in detail, those skilled in the art will appreciate that there are a number of alternative embodiments for accomplishing the method and apparatus of the present invention. Accordingly, the scope of the invention is to be determined only by the following claims.

We claim:

1. A method for processing an incoming call in a telephonic system, the system including a visual display visible to a user, whereby the user is provided with information about a telephone call received by the system from a caller, which call is directed to the user, and the user is given a choice of possible responses for handling the call while the user is presently engaged in on-going voice communications with a first party via a first telephonic communication channel, the method comprising the steps of:

(a) establishing a second communication channel between the telephonic system and the user's display while leaving the on-going voice communications via the first telephonic communication channel intact;

(b) transmitting a message from the telephonic system to the user's display over the second communication channel, the message including visual symbols representing information concerning the telephone call and displaying the visual symbols on the display;

(c) making available to the user a possible response to the message which response consists of choosing one of a plurality of greetings to be audibly played to the caller;

(d) the telephonic system receiving from the user a response indicating the user's chosen greeting, the response being given by the user through an input device; and (e) audibly playing the chosen greeting to the caller.

2. The method of claim 1, wherein the input device includes an audio input component and the greeting is chosen by the user speaking the greeting to the audio input component which captures the greeting and forwards to the system an electrical signal representing the greeting.

3. The method of claim 1, wherein said greetings are prerecorded.

4. The method of claim 3 wherein the display and input device are coupled to a personal computer.

5. The method of claim 4 wherein the second communication channel is a local area network connected between the telephonic system and the personal computer.

6. The method of claim 1 wherein the step of visually displaying the message from the telephonic system to the user on the display device includes the display of information concerning the call, the information being derived from the circumstances of the call made by the caller.

7. The method of claim 6 wherein the information displayed concerning the call includes caller identification where the identification is determined by one of the following methods:

(i) voice recognition of the caller's voice;

(ii) response keyed by the caller to a voice prompt given to the caller; and (iii) caller's number identification.

8. The method of claim 7 wherein the information displayed concerning the call further includes information derived from a database maintained by the user.

9. The method of claim 1 wherein the step of making available to the user a possible response to the message includes the display of information concerning possible alternative responsive actions available to the user for responding to the message.

10. The method of claim 9 wherein the alternative responsive actions available to the user include audibly playing to the caller the chosen greeting and performing one of:

(i) put the caller on hold;

(ii) reroute the call to a designated substitute called party; and (iii) take a recorded voice message.

11. The method of claim 10 wherein the rerouting of the call to a substitute called party further comprises:

receiving from the user an explanation to be audibly played to the substitute called party and audibly playing the explanation to the substitute called party.

12. The method of claim 10 wherein the display and input device are coupled to a personal computer.

13. The method of claim 12 wherein the second communication channel is a local area network connected between the telephonic system and the personal computer.

14. The method of claim 1 wherein the second communication channel is also connected to an audio speaker at the user's location and, in addition to transmitting a message from the telephonic system to the user's display, also audibly playing a voice message from the telephonic system via the second communication channel and the audio speaker before receiving from the user a response indicating the user's chosen greeting.

15. The method of claim 14 wherein the display and audio speaker are coupled to a personal computer.

16. The method of claim 15 wherein the second communication channel is a local area network connected between the telephonic system and the personal computer.

17. A telephonic system for processing an incoming call, the system connected to a visual display visible to a user, an input device available to the user, and a telephone for enabling the user to engage in on-going voice communications with a first party via a first telephonic communication channel, wherein the system is connected to the display via a second communication channel, the system comprising:

(a) means for transmitting a message from the telephonic system to the user's display over the second communication channel while leaving the on-going voice communications via the first telephonic communication channel intact, the message including visual symbols representing information concerning a telephone call received by the system from a caller, which call is directed to the user;

(b) means for making available to the user a possible response to the message which response consists of choosing one of a plurality of greetings to be audibly played to the caller;

(c) means for receiving from the user a response indicating the user's chosen greeting, the response being given by the user through the input device; and (d) means for audibly playing the chosen greeting to the caller.

18. The telephonic system of claim 17, wherein the input device includes an audio input component into which the user may speak a chosen greeting.

19. The telephonic system of claim 17, wherein said greetings are precorded.

20. The telephonic system of claim 19 wherein the second communication channel is adapted for connecting to a personal computer to which are connected the display and the input device.

21. The telephonic system of claim 20 wherein the second communication channel is a local area network connected between the telephonic system and the personal computer.

22. The telephonic system of claim 17 wherein the message from the telephonic system to the display includes information concerning the call, the information derived from the circumstances of the call made by the caller.

23. The telephonic system of claim 22 wherein the information concerning the call includes caller identification where the identification is determined by one of the following methods:
- (i) voice recognition of the caller's voice; and
- (ii) response keyed by caller to a voice prompt given to the caller; and
- (iii) caller's number identification.

24. The telephonic system of claim 23 wherein the information concerning the call further includes information derived from a database maintained by the user.

25. The telephonic system of claim 17 further comprising means for including in the message information concerning possible alternative responsive actions available to the user for responding to the message.

26. The telephonic system of claim 25 wherein the information concerning possible responsive actions available to the user includes audibly playing to the caller the chosen greeting and performing one of:
- (i) put the caller on hold,
- (ii) reroute the call to a designated substitute called party, and
- (iii) take a recorded voice message.

27. The telephonic system of claim 26 further comprising:
means for receiving from the user an explanation to be audibly played to the substitute called party and audibly playing the explanation to the substitute called party.

28. The telephonic system of claim 26 wherein the second channel is adapted for connection to a personal computer to which the display and input device are coupled.

29. The telephonic system of claim 28 wherein the second communication channel is a local area network connected between the telephonic system and the personal computer.

30. The telephonic system of claim 17 wherein the second communication channel is also connected to an audio speaker at the user's location and the system includes means for audibly playing a voice message from the telephonic system via the second communication channel and the audio speaker.

31. The telephonic system of claim 30 wherein the display and audio speaker are coupled to a personal computer.

32. The telephonic system of claim 31 wherein the second communication channel is a local area network connected between the telephonic system and the personal computer.

* * * * *